2 Sheets—Sheet 1.

H. G. FRITZ.
FEED-CUTTERS AND GRINDERS.

No. 180,862. Patented Aug. 8, 1876.

WITNESSES
Chas J Gooch
Le Blond Burdett

INVENTOR
Henry G Fritz
By Knight Bros Attorneys

N. PETERS, PHOTO-LITHOGRAPHER, WASHINGTON, D. C.

2 Sheets—Sheet 2.

H. G. FRITZ.
FEED-CUTTERS AND GRINDERS.

No. 180,862. Patented Aug. 8, 1876.

WITNESSES
Chas. J. Cooke
Le Blond Burdett

INVENTOR
Henry G. Fritz
By Knight Bros. Attorneys

UNITED STATES PATENT OFFICE.

HENRY G. FRITZ, OF LEBANON, PENNSYLVANIA.

IMPROVEMENT IN FEED CUTTERS AND GRINDERS.

Specification forming part of Letters Patent No. 180,862, dated August 8, 1876; application filed April 19, 1876.

*To all whom it may concern:*

Be it known that I, HENRY G. FRITZ, of Lebanon, in the county of Lebanon and State of Pennsylvania, have invented a new and Improved Feed Cutter and Grinder, of which the following is a specification:

My machine is constructed with a pair of feeding-rollers, which feed the material to be cut to the cutting devices, composed of a set of rotary knives and a slotted fixed knife, the latter being adjusted vertically by set-screws working in said slots. The cut feed passes between a pair of rollers, whose grinding-surfaces are composed of sections, with lugs at their ends, united or held together by recessed heads, as hereinafter set forth.

Figure 1:
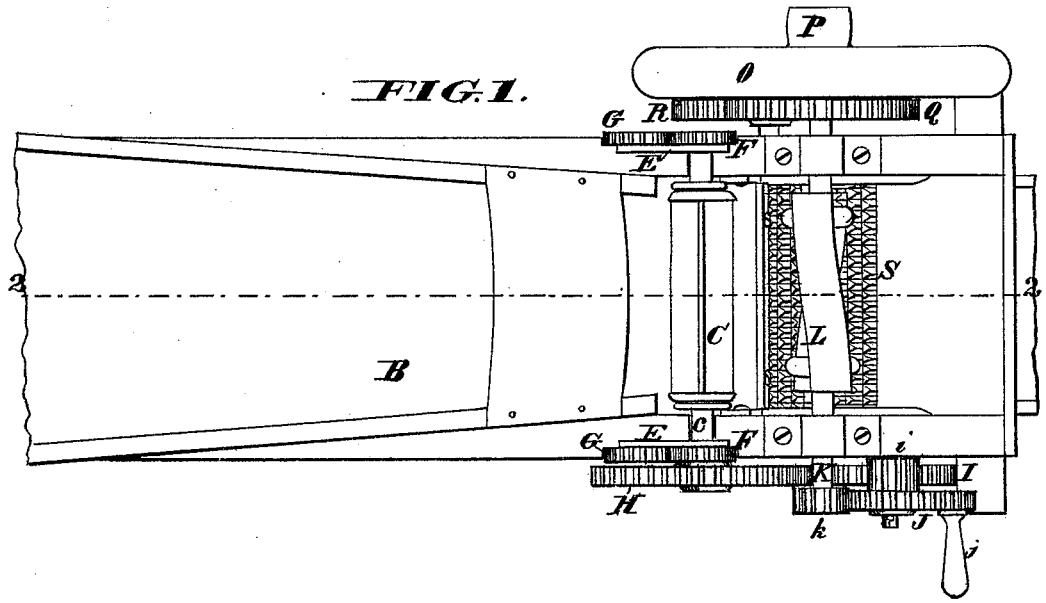
Figure 2:
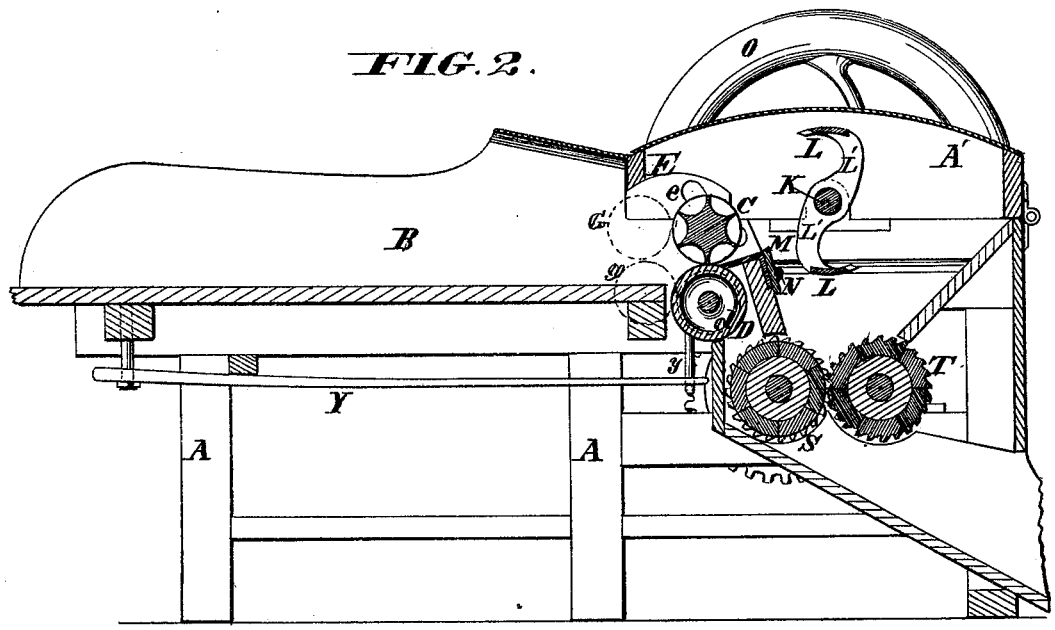
Figure 3:
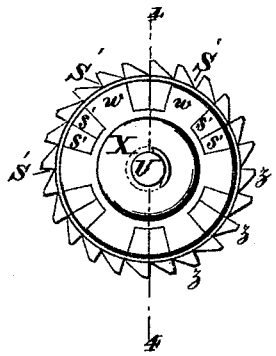
Figure 4:
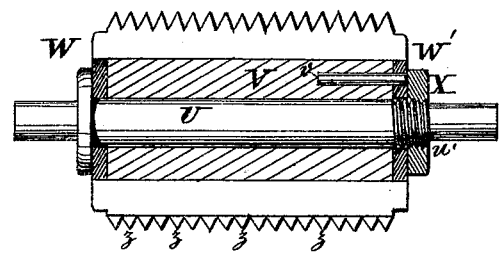
Figure 5:
Figure 6:
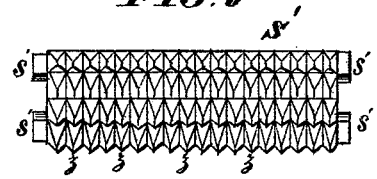
Figure 7:
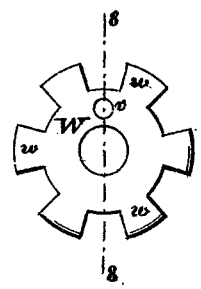
Figure 8:

In the accompanying drawings, Figure 1 is a plan or top view of the machine. Fig. 2 is a vertical longitudinal section on the line 2 2, Fig. 1. Fig. 3 is an end view of one of the grinding-cylinders. Fig. 4 is a longitudinal section of the same. Fig. 5 is an end view of one of the sections thereof. Fig. 6 is a face view of one of the sections. Fig. 7 is an elevation of one of the cylinder-heads detached. Fig. 8 is a section of the same on the line 8 8, Fig. 7.

A A represent various parts of a stationary frame. B is the trough in which the hay or other feed is placed to be cut. C D are a pair of horizontal feeding-rollers, the upper one of which is ribbed or grooved, as shown. The shaft $c$ of the upper roller passes through segment-slots $e$ in the cheek-plates E. The pinions F, on the ends of the roller-shaft $c$, gear with pinions G on the cheek-plates E, and the pinions G with pinions $g$, which latter gear with pinions $d'$ on the lower feed-roller D, and wheel H, to which motion is transmitted through a gear-wheel, I, from the pinion $i$ on the shaft of the master-wheel J. The wheel J is driven by a hand-crank, $j$, or other means, and gears with a pinion, $k'$, on the shaft K of the rotary knives L, which consist of blades mounted obliquely on the ends of the arms L', so as to have an oblique shearing cut with the horizontal knife M. The knife M is constructed with slots, and is fixed in position by set-screws N, so that it may be adjusted up or down to cause the rotary knives L to work in connection with it with sufficient accuracy.

O represents a fly-wheel on the shaft K, and P a band-pulley on the extremity of said shaft, through which it may be driven by means of a belt when worked by power. Q is a gear-wheel meshing with a corresponding wheel, R, on a horizontal roller, S, which is constructed with saw-teeth formed on segment-plates, as hereinafter described. T is a roller of like construction, which is driven in the opposite direction at a much less speed, being mounted on the shaft of the gear-wheel I.

The particular construction of the rollers S and T is illustrated in Figs. 2 to 8 inclusive.

U may represent the shaft of either of said rollers. It is provided, near one end, with a fixed collar, against which rests an annular head, W, and near the other end with a screw-thread, $u'$. V represents a filling, which may be of wood or other material. $v$ represents a pin or dowel driven into the filling V through a hole in an annular head, W'. X is a nut screwed on the thread $u'$, so as to clamp the filling V firmly between the annular heads W W'. The heads W W' are formed, as shown in Figs. 7 and 8, with dovetailed arms or projections $w$, between which are received longitudinal lugs $s'$, which project from the extremities of the segments S', forming the outer shell of the cylinder. The lugs $s'$ are formed and disposed, as shown, so that the two adjoining lugs, of two adjacent roller-segments, will be received in each recess of the cylinder-head, one of the projections or arms $w$ being between each pair of the lugs of one segment. The dovetailed form of the arms $w$ thus holds the segment firmly in place, the cylinder-heads being necessarily passed over the lugs $s'$ endwise, or in a longitudinal direction. The segments are constructed with the saw-shaped teeth $z$. The teeth of one roller work in the interdental spaces of the other roller. Y Y are a pair of springs connected by hooks $y$ with the shaft of the upper feed-roller, so as to hold the said roller tightly down on the hay. A' is a hinged cap, covering the working parts.

Operation: Hay or other feed being introduced in the trough B it is carried between the feed-rollers C D, the upper feed-roller rising sufficiently to accommodate the thickness of the hay and its pinions F F, being kept in gea: with the pinions G by reason of the concentricity with pinions G G and the cheek-plates. The hay is then cut by the stationary knife in customary manner, and falling on the grinding-rollers is carried between the same by their combined rotation; but the much greater velocity of the first roller S causes its saw-shaped teeth to tear and grind the cut hay against the edges of the corresponding teeth of the other roller.

I am aware that feed cutters and grinders have heretofore been used, in which the feed is passed by rollers to the cutting mechanism, consisting of a stationary knife and revolving cutters, and then between grinding-rollers; this, therefore, I do not claim; but What I do claim as new, and desire to secure by Letters Patent, is—

1. The feed-rollers C D, stationary knife M, vertically adjustable by set-screw N, revolving cutters L, and sectional grinding-rollers S T, all arranged as herein set forth.

2. The rollers S T, the grinding-surfaces of which are constructed in sections, having lugs $s'$, united and held together by recessed heads W, as set forth.

HENRY G. FRITZ.

Witnesses:
 HERMAN E. LONG,
 TOBIAS REINOEHL.